Oct. 3, 1950 A. F. THAL 2,524,278
VARIABLE AREA SLIDING VANE TRANSMISSION HAVING
ROTATABLE FLUID TRANSFER UNIT BETWEEN ROTORS
Filed July 17, 1944 8 Sheets-Sheet 5

INVENTOR.
Adolph F. Thal,
BY
Thiess, Olson & Mecklenburg
Attys.

Oct. 3, 1950                A. F. THAL                2,524,278
VARIABLE AREA SLIDING VANE TRANSMISSION HAVING
ROTATABLE FLUID TRANSFER UNIT BETWEEN ROTORS
Filed July 17, 1944                                  8 Sheets-Sheet 7

Fig. 10.

INVENTOR.
Adolph F. Thal,
BY
Theis, Chen & Mecklenburg
Atty's.

Fig. 11

Patented Oct. 3, 1950

2,524,278

UNITED STATES PATENT OFFICE 2,524,278

VARIABLE AREA SLIDING VANE TRANSMISSION HAVING ROTATABLE FLUID TRANSFER UNIT BETWEEN ROTORS

Adolph F. Thal, Elmhurst, Ill.

Application July 17, 1944, Serial No. 545,301

16 Claims. (Cl. 60—53)

This invention relates to means for transmitting power, and more particularly to a fluid transmission of the type having a rotary driving member forming a pump impeller adapted to deliver energy-transmitting fluid to a secondary or driven member forming a motor rotor.

The invention relates broadly to the provision if a fluid transmission adapted to provide a direct fluid coupling between the driving member and the driven member when both assume the same speed to eliminate loss of power due to friction.

This is accomplished by the provision of a fluid transfer unit between the drive and driven members that is so arranged and constructed as to rotate as a unit with these members when they assume substantially the same speed.

As will be apparent from the disclosure herein, it is preferable in the specific embodiment illustrating the invention to provide a freely floating transfer unit to effect a direct fluid coupling at a 1—1 speed ratio between the driving and driven members so as to eliminate the usual fluid frictional resistance by the movement of the fluid internally in a fluid transmission apparatus.

In power transmissions heretofore devised to transmit power, the action of the rotary driving member or pump in transmitting fluid to the driven member or motor is usually the result of vanes or pistons operating in conjunction with rotors on each of these members and with means for varying the effective area of the vanes or pistons to effect a change in the speed or ratio therebetween. Usually, in a fluid transmission, the efficiency in the transmission of power decreases as the speed or ratio of 1—1, or direct drive, is approached. In an effort to overcome this difficulty, many attempts have been made to alter the design of the impeller and motor vanes, or of the motor itself, or to provide other changes in the parts, all of which resulted in intricate mechanisms making the application of the transmission apparatus to practical uses difficult. Notwithstanding these attempts to increase the efficiency as the speed or ratio of 1—1 is approached, no satisfactory structure has as yet been provided that increased the efficiency and transmitted power without loss on direct drive.

In these prior art structures, the various parts are arranged to move relative to each other on direct drive. Such movement, as well as the movement of the fluid that results therefrom, creates a loss of power through friction which can only be avoided, in a practical manner, by a system providing for a direct fluid coupling between the pump and motor to connect these parts and to rotate with the fluid as a unit.

An object of the invention is to provide a fluid transmission having pump and motor rotors and a fluid transfer unit therebetween, the parts being so constructed and arranged that upon direct drive a direct fluid coupling is established between the driving and driven parts of the apparatus, this being accomplished by the rotation of these parts and the fluid as a unit without any substantially relative movement between the same whereby the power is transmitted without loss and losses by friction heretofore encountered are eliminated.

It will be understood that the invention is directed broadly to a fluid transmission apparatus having means for establishing a speed differential upon initial starting and a direct fluid coupling when the drive and driven shafts assume the same speed.

Essentially the invention is directed to two fluid displacing units by means of which the displacement per revolution can be inversely reciprocably varied and coupled through a freely floating fluid transfer unit.

The invention is designed to permit continuous transmission of torque from the drive shaft to the driven shaft without accelerating and decelerating the engine upon each change of speed variation.

The principle of operation characterizing the invention is capable of application in various arts and for various purposes. Among these may be mentioned its use as a motor for airplanes and automobiles, as the power source for driving machine tools, for power transmission generally, and for variable speed driving mechanism.

A further object of the invention resides in a novel arrangement of parts including a novel type of fluid transfer unit uniquely disposed to float freely between the rotors of the pump and motor units and about which the rotors are adapted to rotate until the fluid transfer from one rotor to the other results in equal speeds for both whereby this fluid transfer unit rotates substantially in unison with the motors and other parts and without further movement of the fluid. A still further object is to employ a relatively simple structure to control the capacity of the rotors in accordance with the speed of the drive shaft. To this end, a series of concentric members is provided for axial movement, serving in certain instances as followers for the rotors and in another instance as a sleeve for a separator, the latter two parts comprising the simple form of fluid transfer unit disclosed herein. Each of the followers is adapted to rotate with its rotor and the sleeve is adapted to rotate with the separator. Although these parts rotate independently of each other and are movable with each other axially to effect variations of speed between the drive shaft and the driven shaft, they rotate in unison with each other, as will the rotors and separator of the fluid transfer unit, when the fluid transfer from one rotor to the other produces equal capacities for both rotors. A still further object of the invention in its more specific application is to provide the free floating mounting of the fluid transfer unit between the rotors by arranging the pistons to ride roller tracks upon the separator which act to suspend the separator between the rotors and to allow the same to be free to rotate leisurely according to the speed differential between the drive and driven units, but to be adopted as a functional part of a rotating unit whereby to become a direct fluid coupling between the rotors without loss of power upon direct drive.

The following advantages as well as others are the result of my invention:

(a) Increased efficiency in gasoline consumption;

(b) Elimination of heat caused by fluid friction within the transmission unit upon direct drive;

(c) Decrease of wear between parts as the result of the direct fluid coupling eliminating relative movement between parts;

(d) Simplicity in structure and operation;

(e) Minimum number of parts to effect a direct fluid coupling on direct drive;

(f) Elimination of complete filling of transmission housing to effect an efficient fluid transfer from one rotor to another;

(g) Preventing the trapping of air directly against the inside of the housing and directing the air to the inner portion of the housing;

(h) Permitting idling of motor without the use of a clutch or like mechanism; and (i) Providing a connection between the rotor of the drive shaft and the motor rotor through the fluid transfer unit and a consequent control of the pump unit to rotate the drive shaft and therefore the motor shaft when the motor cannot be normally started and requires a pushing of the vehicle thereof.

Other objects and advantages of the invention will be apparent from the following detailed description when taken in connection with the drawings.

The fluid transmission comprises essentially two fluid displacing units A and B and a fluid transfer unit C disposed between the same and including essentially a free floating body 1 adapted to be so constructed and arranged as to actuate in unison with the parts of the fluid displacing units when they rotate at the same speed.

Although fluid displacing units A and B are for all practical purposes of the same construction which simplifies operation and maintenance, each fluid displacing unit will be separately described. Fluid displacing unit A, preferably termed herein as the pump, comprises a rotor 2 keyed at 3 to a drive shaft 4 connected to the engine and extending therefrom into housing 5 of the fluid transmission in which the aforesaid fluid displacing units A and B and the fluid transfer unit C are disposed. Follower 6 of sleeve-like form is concentrically disposed about pump rotor 2 to rotate therewith and has an end plate 7 provided with a bearing 8 for drive shaft 4 and a plurality of oil openings 9 near the outer periphery to allow for the flow of oil, if used as the liquid herein, into the interior of the follower from the chamber 10 of housing 5 in which the units A, B and C are disposed for actuation and from a chamber 11 adapted to accommodate a speed control device 12 operated by the speed of drive shaft 4 for varying the capacity of the fluid displacing units A and B. In the specific embodiment of the invention illustrated in the drawings, this speed controlled device 12 is shown in the form of a simple centrifugal governor connected at 13 to drive shaft 4 and at 14 to bearing sleeve 8 extending from wall 7 of follower 6. Sleeve 8 is provided with an end head 15 spaced at a predetermined distance from end wall 7 between which a collar 16 of centrifugal governor 12 may move. As will be presently described, the predetermined spacing between end plate 7 of follower 6 and end head 15 is for the purpose of allowing the engine to reach a predetermined speed upon starting before actuating the fluid transmission apparatus, and also to allow for idling of the engine, when so desired, without actuating this apparatus.

Follower 6 is adapted to rotate with rotor 2 but move axially relative to this rotor 2. Rotor 2 is provided with a plurality of radial slots 20 extending inwardly from its periphery, which receive reciprocating piston blades 21. Each piston blade 21 is designed to carry an axially slidable bar 22 designed to operate in a longitudinal slot 24 formed in the wall of follower 6. Each piston 21 is provided with a bead-like outer edge 25 constituting in fact a head with undercut sides connected to the piston blade. This head 25 forms a key adapted to move longitudinally in a correspondingly formed groove 26 in the lower face of bar 22. The arrangement provides, therefore, longitudinal or axial movement of each bar 22 with respect to its piston blade 21, but locks the bar to compel rotation of the bar with the piston as the rotor rotates. Inasmuch as the wall of follower 6 is provided with a series of slots 24, one for each bar 22, follower 6 may be longitudinally or axially moved relative to rotor 2 and piston blades 21 be compelled to rotate with the follower and the rotor when they are rotated by drive shaft 4.

Similarly, fluid displacing unit B comprises a rotor 30 keyed at 31 to driven shaft 32 extending through end plate 33 of transmission housing 5. End plate 33 may be carried by housing 5 in any suitable way, although I have shown a series of bolts 34 and a sealing gasket 35 to provide an oil tight fit. The seal between driven shaft 32 and end plate 33 may be of any suitable type, as in the case of the seal between drive shaft 4 and housing 5 at the opposite end. If so desired, a nut 36 may be provided in each instance to thread into the housing 5 and end wall 33 to compress packing glands 37. A follower 38 is disposed concentrically about motor rotor 30 to rotate therewith, but to move axially relative thereto. Follower 38 is provided with an end wall 39 having a bearing sleeve 40 formed thereon for driven shaft 32 and a series of oil openings 41 disposed near the outer periphery thereof to allow during operation movement of the oil outwardly of follower 38 into the rear of chamber 10 in order to be returned to the front end of this chamber by means of passages 42 cut or formed along the inside face of housing 5. Rotor 30 is also provided with a plurality of radial slots 43 extending inwardly from its periphery to receive a plurality of reciprocating piston blades 44 having bars 45 rotatable with piston blades 44, but longitudinally or axially movable relative to the same, these bars being adapted to reciprocate in slots 46 disposed in the wall of follower 38. Each piston blade is provided with a rounded outer edge 47 adapted to lie in a slot 48 in the lower face of bars 45 and form a key therewith so that piston blades 44 may move longitudinally or axially with respect to bars 45 by causing these bars 45 to rotate with the rotor 30 and to radially reciprocate in slots 46 when piston blades 44 reciprocate in end slots 43.

Fluid transfer unit C includes, as previously stated, body 1 adapted to rotate with pump rotor 2 and motor rotor 30 as a unit when these rotors operate at the same speed. Body 1 is annular and is adapted to lie between rotors 2 and 30, its side faces 50 and 51 being preferably provided with grooved tracks 52 and 53 adapted to receive rollers 54 and 55 mounted upon the end faces of piston blades 21 and 44. When rotors 2 and 30 rotate relative to body 1 of the fluid transfer unit C, movement of rollers 54 and 55 about grooved tracks 52 and 53 will cause pistons 21 and 44 to reciprocate in their respective slots 20 and 43 in accordance with the pattern or design of these grooved tracks, these pistons during this reciprocation moving outwardly of their slots 20 and 43. A concentric sleeve 56 is disposed about body 1 and is keyed thereto to rotate therewith, but to have relatively longitudinal or axial movement.

Figure 10:
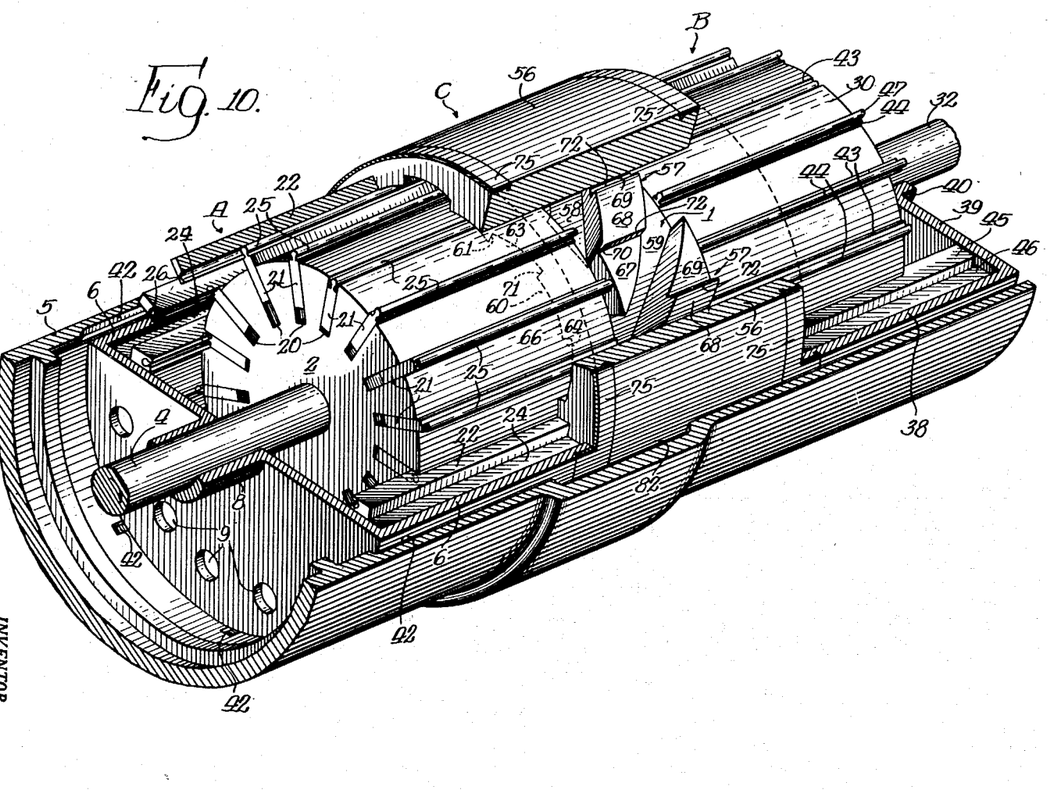
Fig. 10 is a perspective view of fluid transmission apparatus embodying the invention, parts being broken away for purposes of illustration.
Figure 11:
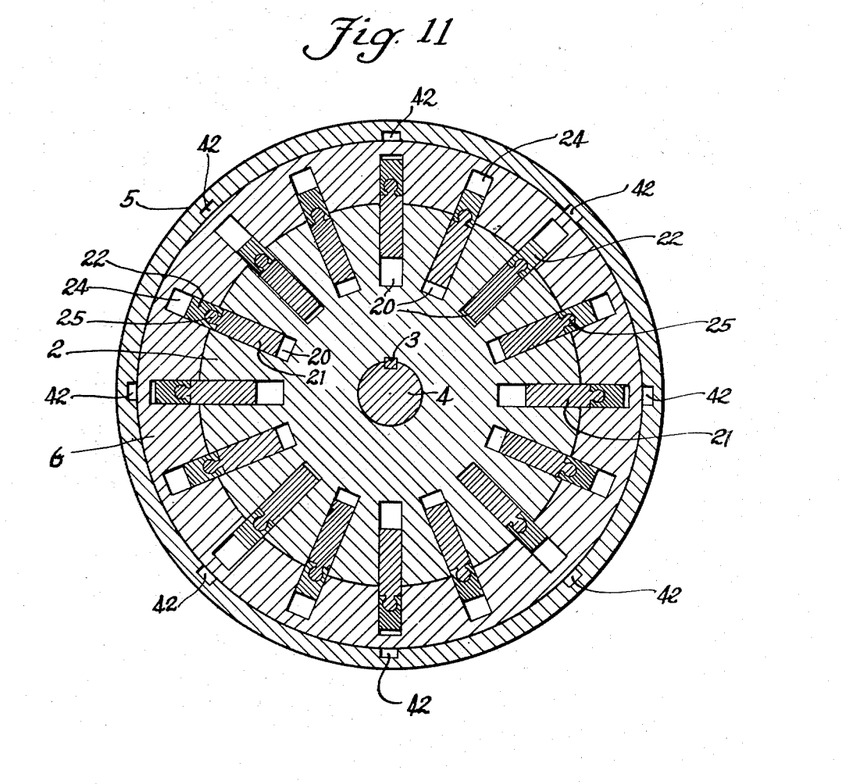
Figure 11 is a transverse sectional view of the fluid transmission apparatus taken substantially through the pump rotor unit, on line 11—11 of Fig. 2.

The simple but novel means of effecting this action also provides the passages permitting the transfer of fluid from the pump side to the motor side. It comprises a series of key members 57, as shown in Figs. 7 and 10, spaced about the periphery of body 1 to form alternately arranged passages 58 and 59, respectively. The inside surface of concentric sleeve 56 is longitudinally cut at spaced distances to form a series of pockets 60 defined by end walls 61 and 62 and recesses 63 and 64. These recesses are spaced by a shoulder 65 forming an arcuate face 66, each pocket 60 extending longitudinally of concentric sleeve 56 so that the cross section of the pocket at any point along sleeve 56 will be the same. Each key 57 is essentially formed of three parts designated 67, 68 and 69. Central part 68 extends above part 67, being the distance of line 70 which is approximately equal or the same as the depth of recess 63 of pocket 60 as indicated by line 71 and also by side wall 61 (see Fig. 10). It will be observed that both side faces 72 of central part 68 extend parallel to the longitudinal axis of sleeve 56 (Fig. 10) and are therefore adapted to engage faces 61 and 71 (Fig. 6), this central part 68 lying therefore in recess 63. Passage 58 is not closed off, however, by reason of central part 68 lying in recess 63. Due to the height of the central part being greater than the recess 63 of pocket 60, passage 58 remains open. End part 67 is adapted to occupy that part of pocket 60 which is disposed directly below the face 66. Consequently, recess 64 to the right remains open and passage 59 also remains open. It will be understood that parts 67, 68 and 69 of key 57 occupy pocket 60 only to the extent of the width of body 1 and that this pocket 60 is therefore exposed on either side of body 1 to the pistons 21 and 44, depending upon the capacity to be provided for either set of pistons.

Figure 5:
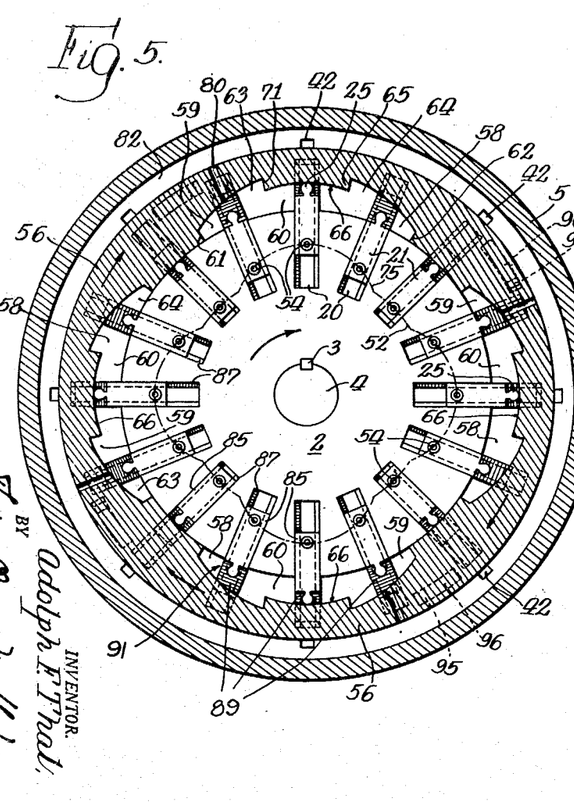
Fig. 5 is a transverse sectional view taken along line 5—5 of Fig. 4 and looking in the direction of the arrows, this view illustrating the action of the pistons in pumping fluid from the pump unit to the motor unit through the fluid transfer unit.
Figure 6:
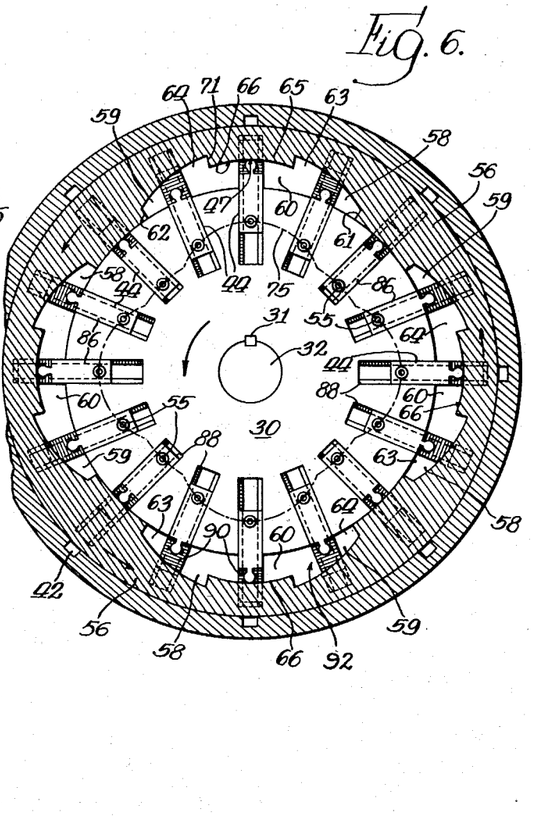
Fig. 6 is a similar sectional view taken along line 6—6 of Fig. 4 and looking in the direction of the arrows to illustrate the action of the pistons of the motor unit.
Figures 7, 9:
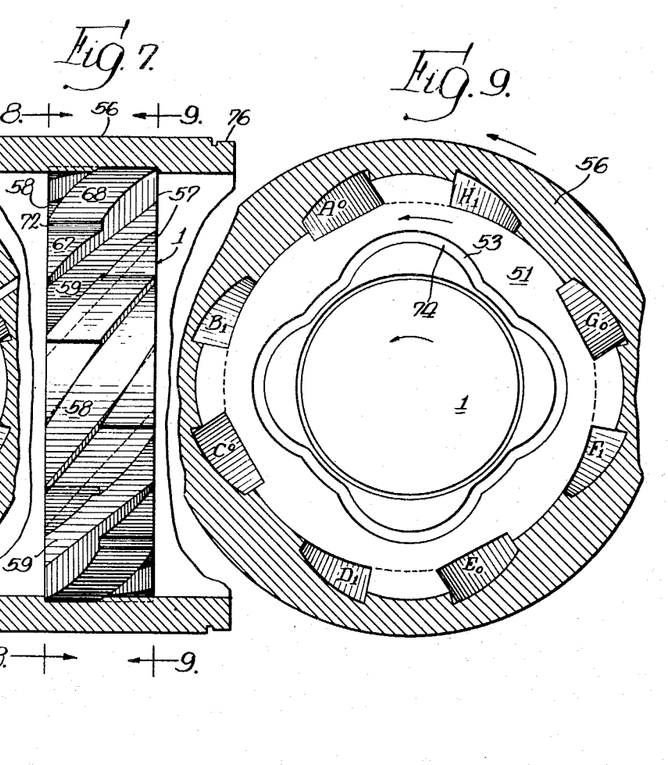
Fig. 7 is a view illustrating the parts of the fluid transfer unit, the separator or rotating body being in elevation to illustrate the formation of its key means and the concentric sleeve, but in cross section.
Fig. 9 is a similar view taken on line 9—9 of Fig. 7 and illustrating the face of the separator adjacent the motor unit, the fluid transfer passages also being shown.

It will be observed in Figs. 5 to 9, inclusive, that the grooved tracks 52 and 53 are of a pattern to follow the contour of pocket 60. Opposite each pocket 60 is a circular portion 74 struck from the same center point as arcuate face 66 of pocket 60. As pump rotor 2 rotates, for example, rollers 54 will follow the curve portion 74 of grooved track 52 to gradually project each piston blade outwardly of its slot 20 until it extends a distance to have its rounded head 25 ride against arcuate surface 66 as indicated in Figs. 5 and 6. As the end of arcuate surface 66 is reached, the grooved track withdraws the piston blade 21 into its groove 20. When a piston blade 21 has its head 25 riding the surface 66, the next piston blade is traveling forwardly and moving outwardly to engage the advance edge of surface 66 as the first piston blade 21 disengages this surface 66. Hence, as shown in Figure 5, there will be a piston blade 21 always or approximately always in contact with surface 66 of pocket 60. It will be observed that as a piston blade 21 engages the forward edge of surface 66, it creates a suction for the liquid in passage 59 that extends across body 1 to the motor rotor side of this fluid transfer unit C. The suction effect will withdraw liquid from the motor rotor side and build up in pocket 60 so that it will be trapped between this piston blade and the succeeding piston blade as the latter engages the advancing edge of curve surface 66. When this occurs, the trapped liquid will be forced under pressure through the passage 58 to the motor side of the fluid transfer unit C to engage one of the piston blades 44 that will have moved to a position in the pocket 60 on that side of body 1 beginning at the advancing edge or corner of the surface 66 exposed to that side of the structure. In Fig. 5 the pistons move clockwise as indicated by the arrow. Inasmuch as Fig. 6 is a view looking at body 1 from the opposite or the motor side, the pistons move counterclockwise. Hence, with respect to pockets 60 on opposite sides of body 1, the pistons 21 and 44 move in the same directions, but oppositely as viewed in Figs. 5 and 6, because these views are looking in opposite directions. Each passage 59 constitutes the outlet and each passage 58 constitutes the inlet to a pocket 60 on the motor side of body 1. Thus, each piston 44 engaging against an arcuate surface 66 of each pocket 60 is subjected to the fluid pumped under pressure by a piston 21 on the pump side of body 1, when this piston 21 has forced the liquid through a passage 58 as its head 25 moves along and engages surface 66 of a pocket 60 on the pump side.

Figure 8:
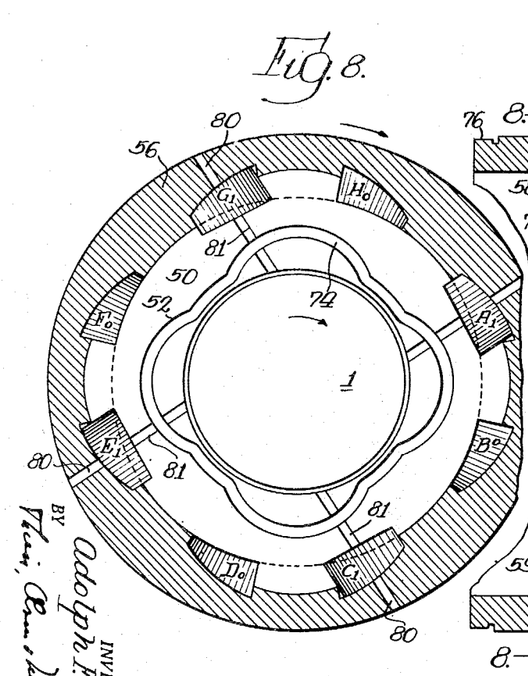
Fig. 8 is a sectional view taken on line 8—8 of Fig. 7 looking in the direction of the arrows, this view illustrating the face of the separator adjacent the pump unit and the fluid transfer passages provided between the separator and the concentric sleeve.

Due to the cross-over action of passages 58 and 59 providing rotation of both rotors 2 and 30 in the same direction, it is not necessary to provide a reversing mechanism. Figs. 5 and 6 illustrate pockets 60 on the pump and motor sides of fluid transfer unit C. While these views indicate by reference characters the recesses 63 and 64 on opposite sides of shoulders 65 having the arcuate faces 66, the passages 58 and 59 are also indicated. It will be understood, however, that passage 59 constituting the inlet of the top pocket 60 of Fig. 5 is not the same passage 59 constituting the outlet of the top pocket 60 of Fig. 6. This cross-over action of the passages causes this passage 59 of the upper pocket 60 in Fig. 5 to extend over to the right-hand pocket 60 in Fig. 6. In other words, piston 44 riding the arcuate face 66 of this right-hand pocket 60 in Fig. 6 is forcing the liquid through the passage 59 of this pocket so as to enter the inlet end of this same passage 59, shown as entering the upper pocket 60 of Fig. 5. To clarify the manner in which passages 58 and 59 extend angularly from the pump side to the motor side, corresponding alphabetical characters are used to designate the corresponding passages 58 and 59 and the characters "o" and "i" are used as subscripts to these references to indicate the outlet and the inlet of these passages on the respective pump and motor sides. In other words, $A_o$ and $A_i$ represent the same passage, the $A_o$ representing the outlet on the motor side, as shown in Fig. 9, and $A_i$ representing the inlet on the pump side, as shown in Fig. 8. In this particular instance, the passage represented by $A_o$ and $A_i$ is this passage 59 of the upper pocket 60 shown in Fig. 5 and of the right-hand pocket 60 shown in Fig. 6. The same is true with the passages designated by the reference characters $B_o$—$B_i$, $C_o$—$C_i$, $D_o$—$D_i$, $E_o$—$E_i$, $F_o$—$F_i$, $G_o$—$G_i$ and $H_o$—$H_i$. Only in the instance of the passages D and H of the upper pockets 60 in Figs. 5 and 6 will the same passage appear at the same location on the pump and the motor sides, but in view of the fact that Figs. 5 and 6 are views looking in opposite directions on opposite sides of the fluid transfer unit C, the passages have been crossed from one side to the other in the same manner as the other passages of other pockets 60.

The purpose of the arrangement of these passages, as previously stated, is to effect rotation of the blades 44 of the motor rotor 30 in the same direction as the blades 21 of the pump rotor 2 and not require the use of additional or auxiliary mechanism to effect rotation of the driven shaft 32 in the same direction as the drive shaft 4 at a point beyond the location of the fluid transmission in the drive of the motor vehicle or power line, as the case may be, in the application of the present invention to a fluid transmission for transmitting energy. As the pistons 21, shown for example in Fig. 5, rotate clockwise as indicated by the arrows, the fluid is forced through each passage 58 of each pocket 60 as each piston 21 has this outer edge 25 riding across arcuate faces 66. During the period the fluid in front of each piston 21 is thus being forced under pressure through the passages 58 of the pockets 60, these pistons 21 as they ride across the arcuate face 66 will at the same time draw or suck the fluid from the motor side of the fluid transfer unit C through the passages 59 of the said pockets 60, whereupon the succeeding piston 21 will move upwardly and forwardly until its top 25 engages the arcuate face 66. The fluid trapped between this next piston 21 and the preceding piston 21 will then be forced by the said next piston 21 under pressure through the passages 58 to the opposite or motor side of the fluid transfer unit C. As the fluid enters the pocket 60 on the motor side of the fluid transfer unit C, it is trapped between the piston 44 riding the arcuate face 66 of each pocket 60 and the next piston 44 as it rises and moves forwardly also to engage the arcuate face 66 as the preceding piston 44 moves away from the arcuate face. As the preceding piston 44 moves away from the arcuate face 66 of each pocket 60, the next or succeeding piston 44 then riding the arcuate face 66 will force this trapped fluid back through the passage 59 of the particular pocket 60 so as to enter the corresponding pocket 60 on the opposite or pump side of the fluid transfer unit C. It will be noted that any number of pockets 60 may be provided for the opposite sides of the fluid transfer unit. It is apparent that the pumping or movement of the fluid from one side to the other by means of the fluid transfer unit will become smoother as the number of pockets 60 increases. Consequently, I do not wish to be limited to the number of pockets 60 and the number of pistons 21 and 44.

Figure 1:
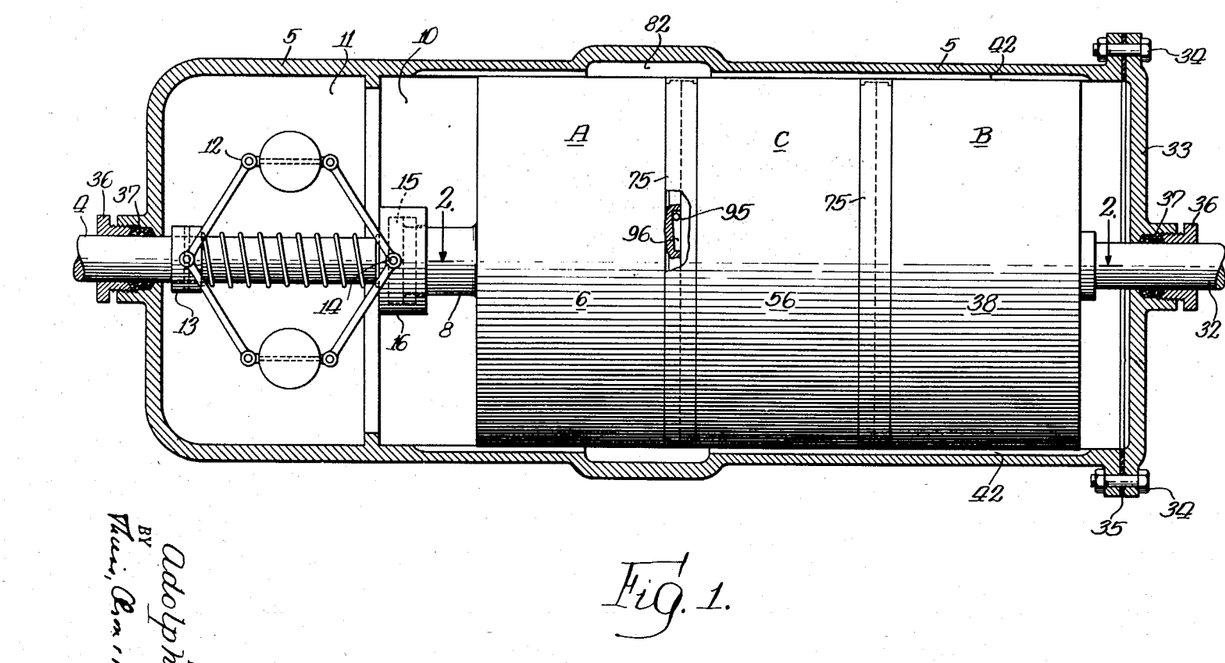
Figure 1 is a side view partly in elevation and partly in section, with a portion of the housing broken away, of one form of fluid transmission embodying the invention.
Figure 2:
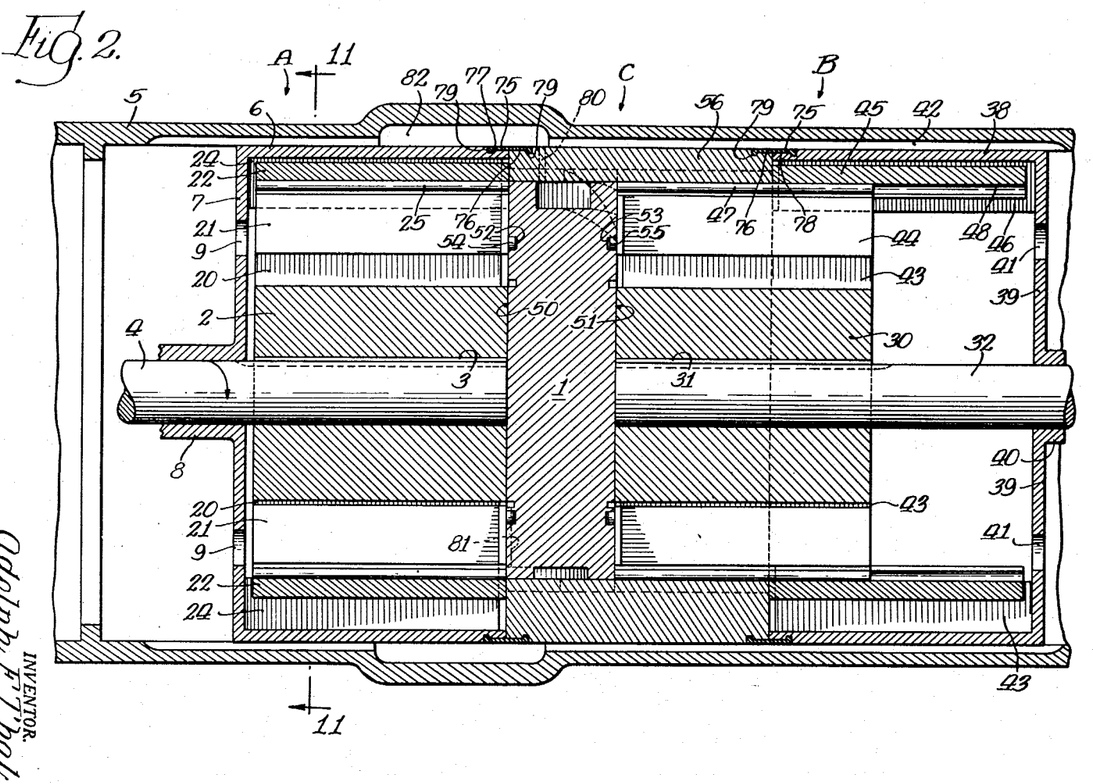
Fig. 2 is an enlarged vertical sectional view taken on line 2—2 of Fig. 1, the parts being illustrated in idling position.

The pump unit A, motor unit B and the fluid transfer unit C are shown in idling position in Figs. 1, 2 and 10. As previously stated, collar 8 has its head 15 spaced a distance from end plate 7 of follower 6, in order to permit the engine or power unit to operate at idling speed up to a predetermined point without effecting a transfer of power from the pump unit A to the motor unit B. It is apparent that this idling speed may vary through movement of the cage 16 or equivalent device of the speed governor 12 along collar 8 until it reaches head 15. Any increased speed of the engine or power unit causing governor 12 to move cage 16 against head 15 so as to move the latter therewith will cause follower 6 to move to the left as shown in the drawings. Movement of follower 6 to the left will cause sleeve 56 of the fluid transfer unit C and the follower 38 of the motor unit B to move axially therewith. This may be accomplished by any suitable connecting means between these parts that will effect this axial movement without effecting the rotation of each of these parts with reference to the rotors and the rotating body 1. The drawings illustrate band members 75 recessed in cut-away edges indicated at 76 (Fig. 7) along opposite peripheral sides of the sleeve 56 of the fluid transfer unit C and similar cut-away portion 77 in the adjacent peripheral edge of follower 6 and cut-away portion 78 in the adjacent peripheral edge of follower 38. Each band 75 has its edges turned down as indicated at 79 to cause band 75 to act as key members providing for axial movement of all but permitting independent rotational movement of the followers 6 and 38 and the sleeve 56.

In idling position, shown in Fig. 2, pistons 21 lie the entire length in their slots 20 so as not to leave any effective area exposed and thereby prevent any pumping of the fluid through the fluid transfer unit C as rotor 2 rotates. In this position, pistons 44 of the motor rotor 30 have a maximum area exposed to the liquid, but, as the liquid is not moving, the motor rotor 30 will not rotate. Increasing the speed of operation of the engine or prime mover and consequently the speed of rotation of shaft 4 will result in the governor 12 gradually moving follower 6 to the left and also sleeve 56 with follower 38, the pistons 21 being thereby exposed so that they will have an effective operating area to effect pumping or forcing of the fluid through the passages 58 of the fluid transfer unit C to the exposed area of pistons 44 of the motor unit B. At the starting of the pumping operation, pistons 21 of the pump unit A will have a relatively small effective area thereof exposed, while pistons 44 of the motor unit B will have a relatively large effective area exposed. Consequently, pistons 44 will turn slowly at the start compared to the speed of rotation of pistons 21. The speed differential on initial starting will continue to vary as the effective area of pistons 21 will increase and the effective area of pistons 44 will decrease whereby the speed of driven shaft 32 will increase in ratio with respect to the speed of drive shaft 4. This change in speed ratio will continue until the effective areas of pistons 21 and 44 become equal whereupon these pistons will rotate in unison and at the same speed. The fluid transfer unit C comprising rotating body 1 and its sleeve 56 will likewise rotate in unison and at the same speed with the pistons 21 and 44 together with their rotors 2 and 30. It will, of course, be understood that the followers 6 and 38 of rotors 2 and 30 will rotate at the same speed and in unison when this direct drive ratio between the pump and motor units is reached.

Inasmuch as the fluid displacement will be the same on opposite sides of the fluid transfer unit C, pistons 21 and 44 and both rotors will rotate at the same speed, thereby rotating body 1 with these pistons and rotors and at the same speed without any substantial movement of fluid in the unit.

When drive shaft 4 first rotates, say, at idling speed, pistons 21 of pump rotor 2 will lie within slots 20 without any effective area exposed to effect a transfer of fluid through unit C to motor rotor 30, but during such idling rotation, rollers 54 of pistons 21 will be travelling around in their track 52 in the adjacent face of body 1. This will tend to rotate body 1 slowly in the direction of rotation of rotor 2, but, of course, not at the same speed of rotation. When drive shaft 4 increases its speed, sleeve 56 will be moved to the left as viewed in Figs. 2 and 3 and a portion of pistons 21 will be exposed. Rotation will be in the direction of the arrow in Fig. 5. As piston rollers 54 will ride in their track 52, the pistons 21 will move upwardly beginning at corner 61 until it engages face 61 and rides in contact therewith in clockwise direction, thereby creating a suction is passage 59 and building up a pressure in passage 58. The suction created in passage 59 tends to draw in fluid to pocket 60 from the motor rotor 30 and the pressure built up in passage 58 tends to pump liquid from pocket 60 to the motor rotor 30. There will preferably always be a piston 21 in contact with face 66 of pocket 60, and hence, this suction and pressure condition in passages 59 and 58 will always be effectively maintained. As drive shaft 4 picks up speed and more effective area of pistons 21 will be exposed, more liquid will be transferred through unit C to motor rotor 30 and its pistons 44 and obviously motor rotor 30 will pick up speed. Body 1 will also rotate faster, but there will be a differential between these shafts 4 and 32 and body 1 until these shafts rotate substantially at the same speed when all parts will rotate together as a unit. The action of motor pistons 44 will operate on the motor side of body 1 in the same manner as pistons 21 on the pump side. These pistons 44 will tend to draw fluid through passages 58 from the opposite or pump side of body 1, while, at the same time, they will pump fluid back through passages 59 to the pump side. This is shown in Fig. 6, the arrow indicating the direction of rotation.

From the foregoing description, it will be apparent that the entire casing 5 need not be filled with fluid in order to transmit power from the drive shaft 4 to the driven shaft 32. In operation, the fluid will be thrown outwardly against the casing 5 by centrifugal force. The central part of the device, which includes that part extending radially inwardly from the bottom of slots 20 and 43, may not contain any fluid because it is outside of the effective operating area of the pistons 21 and 44, it only being necessary to maintain a body of oil within casing 5 of a depth from the wall of this casing 5 inwardly to include the effective area of the pistons as they reciprocate in their slots 20 and 43 and have their forward portions uncovered by the movement of the followers 6 and 38 to the right or the left. This movement of the followers 6 and 38 to the right or to the left to vary the effective capacity of the pistons of either the pump unit or of the motor unit also changes the relative position of the pistons within the pockets 60 of the sleeve 56, either to expose a greater effective area thereof or to decrease the same, as the case may be. If this portion within casing 5 contains fluid, the device will transmit energy from the drive shaft to the driven shaft. However, the entire interior of casing 5 may be filled, if so desired, but, by the arrangement disclosed, failure to maintain the same completely filled will not decrease the efficiency of operation as in prior devices when losses occurred through leakage or failure of attendants properly to service the unit regularly.

Hence, when the device is not operating, the oil will settle in the bottom of casing 5 so that its level may be at any desired point to retain a quantity sufficient for effective operation. When operation begins, the oil is thrown outwardly to the area of the unit adapted to provide effective operation. To assure that air will not be trapped against the inside of casing 5, or in passages 42, that are adapted to provide for equalization of the oil at both ends of the unit, a number of passages 80 may be provided in sleeve 56 which will connect with either of passages 58 and 59 and then with air passages 81 formed in the face 50 of body 1 that lead inwardly to the center where the air can accumulate and force the oil that would otherwise be held at this point to the other portion of casing 5 where it will be most effective. It is found desirable to provide the annular pocket 82 in casing 5, say at or near the location of air passages 80 and 81, so that an accumulation of air along casing 5 may collect in pocket 82 and be moved inwardly to the center of the device by air passages 80 and 81.

It will be observed that bars 22 and 45 serve to close off slots 24 and 46 in followers 6 and 38, respectively, as more or less of the effective area of the pistons is exposed and caused to operate in the space of pockets 60 in opposite sides of rotating body 1. Thus, the oil is kept mainly at these points in pockets 60 to be effective with respect to the said exposed areas of the pistons and not permitted to flow backwardly through slots 24 and 46. In this connection, it will be observed in Figs. 5 and 6 that the faces of pistons 21 and 44, which carry the rollers 54 and 55 that ride in tracks 75 in faces 50 and 51 of body 1, are provided with heads 85 and 86, respectively, which ride in recesses 87 and 88 in the faces of rotors 2 and 30. The rollers are in fact mounted on heads 85 and 86, the heads being of greater width than the cross-sectional thickness of the pistons 21 and 44 whereby they aid in effectively preventing the leakage of oil backwardly through slots 20 and 43. Similar heads 89 and 90 and recesses 91 and 92 are provided for bars 22 and 45 for the same purpose, these bars having axial movement with respect to the pistons so that as the bars are moved backwardly by the followers to expose more of the effective area of the pistons on either side, the heads of bars separate from the heads of the pistons, but each remain in their respective recesses to keep the slots carrying the pistons and the bars closed to the flow of oil.

In the operation of the fluid transmission, rotor 2 is adapted to rotate at a different speed from rotor 30 when the engine or power unit is operated at an increased speed to affect the position of the parts shown in Fig. 2 which illustrates idling position. As this speed increases, the followers 6 and 38 and sleeve 56 are moved further to the left with the result that more of the effective area of the pistons 21 of the pump unit A is exposed and less of the pistons 44 of the motor unit B. Consequently, more fluid is pumped or forced by the pistons 21 to the pistons 44 with the result that the speed of rotor 30 and hence the driven shaft 32 is increased. This change of speed differential continues until the effective area or capacity of the pistons 21 equal the effective area or capacity of the pistons 44. It will be remembered that rotating body 1 is rotatably supported upon the rollers 54 and 55 of the pistons by reason of these rollers 54 and 55 riding in the tracks 75 in the faces 50 and 51 of this body 1. When the capacities of both sets of pistons 21 and 44 become equal, the fluid displacement will be the same on both sides of body 1, and hence, the pistons will rotate at the same speed. Body 1 will then turn with these pistons and therefore rotate at the same speed. Inasmuch as the followers 6 and 38 rotate with their respective rotors 2 and 30 and sleeve 56 rotates with body 1, it will be observed that a novel and unique condition will exist when direct drive between drive shaft 4 and driven shaft 32 is reached. All movable parts will rotate as a unit and substantially at the same speed. Losses heretofore occurring as the result of frictional resistance by movement of the fluid or frictional losses by relative movement of the parts are eliminated. Increased efficiency in the transmission of power is thereby obtained due to the elimination of the frictional resistance, wear between parts and heat caused by friction.

Figure 3:
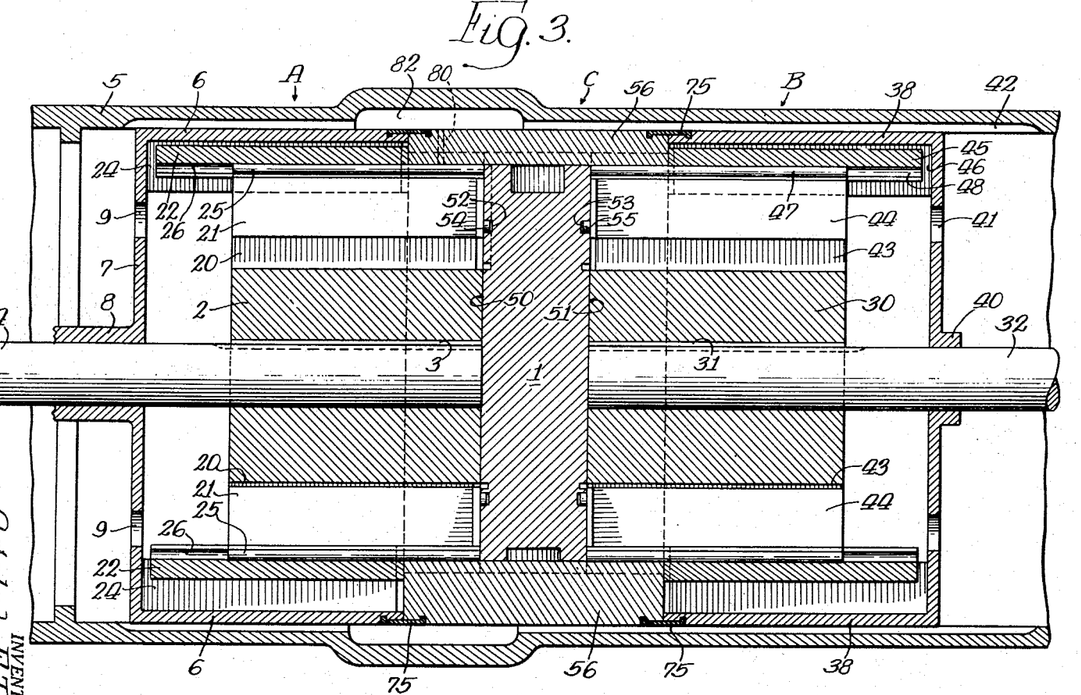
Fig. 3 is a view similar to Fig. 2, but illustrating the parts in their position upon direct drive when the fluid transfer unit becomes a direct fluid coupling and all the parts rotate as a unit within the housing.
Figure 4:
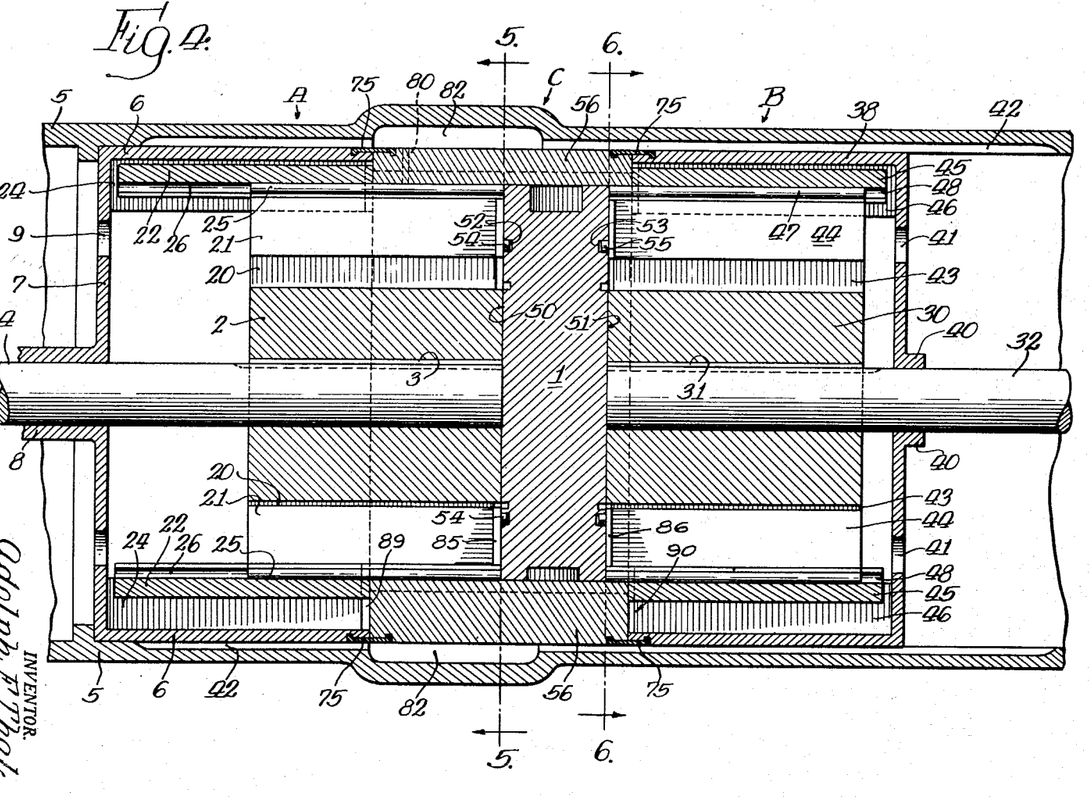
Fig. 4 is a view similar to Figs. 2 and 3, but illustrating the parts in a position providing for a speed differential providing for greater speed for the driven shaft than for the driving shaft.

The position of the parts on direct drive is shown in Fig. 3. The position of the parts when the speed of the driven shaft 32 exceeds the speed of drive shaft 4 is shown in Fig. 4. As a matter of fact, the maximum high speed for driven shaft 32 is shown in this view. Fig. 1 illustrates an arrangement providing for rotation of rotor 2 and hence the drive shaft 4 in the event the engine or prime mover cannot turn over and such operation of the same is desirable to start the engine due to failure of the ignition system or other cause that prevents initial starting through the usual starter device. Assuming that the vehicle embodying the herein disclosed transmission may be moved through power being applied at the rear end of the vehicle as by another vehicle or the like, driven shaft 32 will turn over to rotate its rotor 30. The position of the parts at the time is shown in Fig. 2. Pistons 44 of rotor 30 will have a substantial portion of their effective area exposed for pumping action. The fluid which is thus pumped will turn the separator body 1 and its sleeve 56, but the pump unit A will not move due to the fact that its pistons 21 are completely disposed in their slots 20 and do not have any effective area exposed. When sleeve 56 rotates with separator body 1, a series of ball bearings 95 riding in tapered slots 96 in the edge of follower 6 adjacent sleeve 56 will act to clutch the two parts together so that follower 6 will also rotate. This action will rotate the pistons 21 and rotor 2 with the result that drive shaft 4 is turned in order to turn over the engine to effect starting thereof.

From the foregoing description, it will be apparent that the fluid transmission disclosed herein is constructed of a few but sturdy parts that are so arranged as to provide a direct fluid coupling or direct drive between the pump unit and the motor unit, the structure being such that all the parts including the fluid rotate substantially as a unit at substantially the same speed of rotation. It will be observed that the mechanical structure providing for the transfer of fluid from the pump unit to the motor unit is simple and of a character eliminating the need for reversing devices heretofore provided in fluid transmissions in order to obtain the same direction of rotation for the driven shaft as the drive shaft.

I do not intend to be limited to the exact design of fluid displacing units A and B disclosed herein, or to the exact design of fluid transfer unit C disclosed herein, inasmuch as I believe that I am the first to disclose a direct fluid coupling between the two displacing units on direct speed and I intend to claim the same broadly.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In power transmission apparatus, a drive shaft, a driven shaft, a rotor for each shaft, a closed fluid circulating system connecting said rotors, a fluid transfer unit between said rotors, blades on said rotors, means for varying the effective area of said blades for varying the capacity of both rotors, and means controlled by the speed of said drive shaft for causing both rotors and said fluid transfer unit to rotate in unison when the capacities of said rotors are equal.

2. In power transmission apparatus, a drive shaft, a driven shaft, a rotor for each shaft, a closed fluid circulating system connecting said rotors, a rotatable fluid transfer unit acting as a separator between said rotors to form a pump and a motor, means for varying the effective speed ratio of said pump and said motor, and means for establishing a direct fluid coupling between said pump and said motor when reaching equal speed by rotating said fluid transfer unit and said rotors substantially as a unit.

3. In power transmission apparatus, a drive shaft, a driven shaft, a rotor for each shaft, a closed fluid circulating system connecting said rotors, a fluid transfer unit between said rotors to form a pump and a motor, means for varying the effective speed ratio of said pump and said motor whereby to rotate said rotors and said fluid transfer unit at different speeds, and means for establishing a direct fluid coupling between said pump and said motor when reaching substantially equal speed by rotating said fluid transfer unit and said rotors substantially as a unit.

4. In power transmission apparatus, a drive shaft, a driven shaft, a rotor for each shaft, a fluid circulating system, a fluid transfer unit between said rotors, means for varying the capacity of both rotors, and means for establishing a fluid coupling between said rotors when said rotors reach substantially equal capacity by rotating all of said parts substantially as a unit.

5. In power transmission apparatus, a drive shaft, a driven shaft, a rotor for each shaft, a fluid circulating system, a fluid transfer unit between said rotors, means actuable by the speed of said drive shaft for varying the capacity of both rotors, and means for establishing a fluid coupling between said rotors when said rotors reach substantially equal capacity by rotating all of said parts substantially as a unit.

6. In power transmission apparatus, a drive shaft, a driven shaft, a rotor for each shaft, a fluid circulating system, a fluid transfer unit between said rotors, axially movable means adapted for actuation by the speed of said drive shaft for varying the capacity of said rotors, and means for establishing a fluid coupling between said rotors when said rotors reach substantially equal capacity by rotating all of said parts substantially as a unit.

7. In power transmission apparatus, a drive shaft, a driven shaft, a rotor for each shaft, a fluid circulating system, a fluid transfer unit between said rotors, means for varying the capacity of said rotors, said fluid transfer unit comprising a separator rotatably disposed between said rotors and a concentric member axially movable with respect to said separator but rotatable therewith, there being passages between said separator and its said concentric member to provide for the flow of fluid from one to the other of said rotors.

8. In power transmission apparatus, a drive shaft, a driven shaft, a rotor for each shaft, a fluid circulating system, a fluid transfer unit between said rotors, means for varying the capacity of said rotors, said means including a concentric follower for each rotor, said fluid transfer unit including a separator in the form of a rotatable body between said rotors and a concentric sleeve about said rotatable body axially movable with respect thereto but rotatable with said body, and means for keying said followers and said concentric sleeve to move as a unit axially but rotatable independently of each other, and means for axially moving said followers and said concentric sleeve as a unit according to the speed of said drive shaft.

9. In power transmission apparatus, a drive shaft, a driven shaft, a rotor for each shaft, a fluid circulating system, a fluid transfer unit between said rotors, means for varying the capacity of said rotors, said means including a concentric follower for each rotor, said fluid transfer unit including a separator in the form of a rotatable body between said rotors and a concentric sleeve about said rotatable body axially movable with respect thereto but rotatable with said body, and means for keying said followers and said concentric sleeve to move as a unit axially but rotatable independently of each other, and means for axially moving said followers and said concentric sleeve as a unit according to the speed of said drive shaft, each of said followers rotating at the same speed as its rotor and said concentric sleeve rotating at the same speed as said rotatable body, said parts being so constructed and arranged that said concentric followers and sleeve and said rotors and body rotate substantially as a unit, all turning substantially at the same rate when the capacities of said rotors are substantially equal.

10. In power transmission apparatus, a drive shaft, a driven shaft, a rotor for each shaft, a fluid circulating system including said rotors, piston blades on said rotors, means for varying the effective area of said piston blades for varying the capacity of both rotors including a follower for each rotor, said followers being actuable by the speed of said drive shaft, and a fluid transfer unit including a sleeve between and actuable by said followers and a rotatable body between said rotors, said sleeve and said rotatable body establishing a direct fluid coupling between said rotors when the capacity of the piston blades on one rotor equals the capacity of the piston blades in the other rotor.

11. In power transmission apparatus, a drive shaft, a driven shaft, a rotor for each shaft, piston blades in said rotors, means for varying the effective area of said piston blades for varying the capacity of both rotors including a follower for each rotor, a fluid transfer unit including a sleeve between said followers and actuable by at least one of said followers and a rotatable body between said rotors, means for actuating said piston blades with respect to their said rotors, said means being disposed on opposite faces of said rotating body and movable relative to said rotors when said rotors rotate at variable speeds, said actuating means and said blades together with said rotors and said rotating body rotating as a unit without substantial rotative movement therebetween when rotors rotate substantially at the same speed.

12. In power transmission apparatus, a drive shaft, a driven shaft, a rotor for each shaft, radially disposed piston blades reciprocable into and out of said rotors, a rotatable body between said rotors, there being means on said rotatable body to reciprocate said piston blades upon relative movement between each rotor and said body, means adapted to vary the effective area of said piston blades as they reciprocate, said rotors reaching equal speed and said rotating body moving in unison therewith when the effective area of said piston blades on one rotor become equal to the effective area of said piston blades on the other rotor.

13. In power transmission apparatus, a drive shaft, a driven shaft, a rotor for each shaft, a fluid transfer unit between said rotors, means actuable by the speed of said drive shaft for varying the capacity of said rotors to effect a fluid drive from the rotor of said drive shaft to the rotor of said driven shaft, and means temporarily to connect said rotors mechanically upon starting from idle position whereby to rotate said drive shaft and its rotor and thereby actuate said capacity actuating means.

14. In power transmission apparatus, a drive shaft, a driven shaft, a fluid displacing unit for each shaft, and a fluid transfer unit, said fluid transfer unit including a body, means for mounting said body between said fluid displacing units to rotate at the same speed as said fluid displacing units and differentially with respect thereto when said fluid displacing units rotate at different speeds, and means actuated by the speed of said drive shaft for establishing a fluid coupling between said fluid displacing units to rotate said body in unison with said fluid displacing units when said shafts reach substantially the same speed.

15. In a power transmission apparatus, a driving rotor, a driven rotor, a fluid circulating system including said rotors, a fluid transfer unit for effecting a transfer of fluid from one to the other rotor, means for increasing the effective exposed area of said driving rotor and decreasing the effective exposed area of said driven rotor whereby to increase the displacement of fluid to said driven rotor and to increase the speed of said driven rotor, and means for so mounting said fluid transfer unit as to cause said rotors and said unit to rotate at the same rate without relative movement of said parts or displacement of the fluid from said driving rotor to said driven rotor when the effective exposed areas of both rotors are substantially equal.

16. In a power transmission apparatus, a driving rotor, a driven rotor, a fluid circulating system including said rotors, means for varying the capacity of said rotors, means for increasing the effective capacity of said driving rotor and decreasing the effective capacity of said driven rotor whereby to increase the displacement of fluid to said driven rotor and thereby to increase the speed of said driven rotor, and means for so mounting said fluid transfer unit as to cause said rotors and said unit to rotate at the same rate without relative movement of said parts or displacement of the fluid from said driving rotor to said driven rotor when the effective capacities of both rotors are substantially equal.

ADOLPH F. THAL.

REFERENCES CITED

The following references are of record in the file of this patent:

UNITED STATES PATENTS

| Number | Name | Date |
|---|---|---|
| 1,080,282 | Kellogg | Dec. 2, 1913 |
| 2,242,714 | Willson | May 20, 1941 |
| 2,292,993 | Curtis | Aug. 11, 1942 |
| 2,323,926 | McGill | July 13, 1943 |

FOREIGN PATENTS

| Number | Country | Date |
|---|---|---|
| 279,608 | Germany | Oct. 27, 1914 |
| 227,266 | Great Britain | Jan. 15, 1925 |
| 281,107 | Great Britain | Dec. 1, 1927 |
| 336,475 | Great Britain | Oct. 16, 1930 |